United States Patent
Castellanos Zamora et al.

(10) Patent No.: US 9,635,062 B2
(45) Date of Patent: Apr. 25, 2017

(54) LOSS OF SIGNALLING BEARER TRANSPORT

(75) Inventors: David Castellanos Zamora, Madrid (ES); Susana Fernandez Alonso, Madrid (ES); Jose Javier Pastor Balbás, Madrid (ES); Stephen Terrill, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1660 days.

(21) Appl. No.: 12/305,513

(22) PCT Filed: Jun. 20, 2006

(86) PCT No.: PCT/SE2006/000767
§ 371 (c)(1),
(2), (4) Date: Jun. 30, 2009

(87) PCT Pub. No.: WO2007/149020
PCT Pub. Date: Dec. 27, 2007

(65) Prior Publication Data
US 2010/0040047 A1    Feb. 18, 2010

(51) Int. Cl.
*H04L 12/66*    (2006.01)
*H04L 29/06*    (2006.01)

(52) U.S. Cl.
CPC ...... *H04L 65/1016* (2013.01); *H04L 65/1043* (2013.01)

(58) Field of Classification Search
CPC .................. H04L 65/1043; H04L 65/1016

USPC .......................... 370/352, 225, 228
See application file for complete search history.

(56) References Cited

U.S. PATENT DOCUMENTS

| | | | |
|---|---|---|---|
| 6,683,853 B1* | 1/2004 | Kannas et al. | 370/237 |
| 6,754,232 B1* | 6/2004 | Tasker | 370/477 |
| 7,315,512 B2* | 1/2008 | Xi | 370/228 |
| 2004/0085949 A1* | 5/2004 | Partanen et al. | 370/352 |
| 2005/0068889 A1* | 3/2005 | Chavez et al. | 370/225 |
| 2005/0259679 A1 | 11/2005 | Chowdhury | |
| 2007/0275710 A1* | 11/2007 | Mayer et al. | 455/423 |
| 2009/0268723 A1* | 10/2009 | Przybysz | 370/352 |

OTHER PUBLICATIONS

3GPP TS 23.203 v1.0.0 (May 2006) 3rd Generation Partnership Project; Technical Specification Group Services and System Aspects; Policy and charging control archtecture (Release 7), May 2006.*

(Continued)

*Primary Examiner* — Luat Phung

(57) ABSTRACT

Being aware of a loss of signalling bearer transport through an IP Connectivity Access Network is an important issue. Therefore, the present invention relies on amending the Policing and Charging Control model with means to provide the IMS infrastructure with subscriptions to and notifications about signalling session events detected on the signalling IP flow transported through the bearer layer. To this end, a P-CSCF, or AF included therein, is amended to allow the establishment of a signalling session for subscription to notification of bearer level events for a signalling IP flow. Apart from that, new processing rules are required at the AF and PCRF for handling the signalling session, the notification of events and the termination of the signalling session.

20 Claims, 4 Drawing Sheets

(56) References Cited

OTHER PUBLICATIONS

3GPP TS 23.203 V1.0.0 (May 2006); 3rd Generation Partnership Project; Technical Specification Group Services and System Aspects; Policy and charging control architecture (Release 7).

3GPP TS 29.209, 3rd Generation Partnership Project, Technical Specification Group Core Network and Terminals; Policy Control over Gq interface (Release 6); Mobile Competence Centre, 650, Route des Lucioles, F-06921 Sophia-Antipolis Cedex, France; Sep. 1, 2005.

3GPP TS 29.212, 3rd Generation Partnership Project, Technical Specification Group Core Network and Terminals; Policy and Charging Control over Gx reference point (Release 7); Mobile Competence Centre, 650, Route des Lucioles, F-06921 Sophia-Antipolis Cedex, France; May 1, 2006.

3GPP TS 29.207, 3rd Generation Partnership Project, Technical Specification Group Core Network and Terminals; Policy control over Go interface (Release 6); Mobile Competence Centre, 650, Route des Lucioles, F-06921 Sophia-Antipolis Cedex, France; Sep. 1, 2005.

3G TS 23.228 v2.0.0 (Mar. 2001); 3rd Generation Partnership Project; Technical Specification Group Services and System Aspects; IP Multimedia (IM) Subsystem—Stage 2, Valbonne, France.

3GPP TS 22.173 v7.3.0 (Mar. 2007); 3rd Generation Partnership Project; Technical Specification Group Services and System Aspects; IP Multimedia Core Network Subsystem (IMS) Multimedia Telephony Service and supplementary services Stage 1; (Release 7); Valbonne, France.

3GPP TS 23.203 v10.6.0 (Mar. 2012); 3rd Generation Partnership Project; Technical Specification Group Services and System Aspects; Policy and charging control architecture (Release 10).

3GPP TS 23.125 v6.8.0 (Mar. 2006); 3rd Generation Partnership Project; Technical Specification Group Services and System Aspects; Overall high level functionality and architecture impacts of flow based charging; Stage 2 (Release 6).

3GPP TS 23.207 v9.0.0 (Dec. 2009); 3rd Generation Partnership Project; Technical Specification Group Services and System Aspects; End-to-end Quality of Service (QoS) concept and architecture (Release 9); Valbonne, France.

3GPP TS 24.229 v10.6.1 (Jan. 2012)/ 3rd Generation Partnership Project; Technical Specification Group Core Network and Terminals; IP multimedia call control protocol based on Session Initiation Protocol (SIP) and Session Description Protocol (SDP); Stage 3 (Release 10).

3GPP TR 23.818 v0.10.0 (Feb. 2007); 3rd Generation Partnership Project; Technical Specification Group Services and Architecture; Optimisations and Enhancements for Realtime IMS communication (Release 7); Valbonne, France.

Vodafone Gx+ interface specification, Version 1.3.1, Vodafone Global Core Networks, Oct. 12, 2014.

3GPP TS 29.214 v0.2.0; 3rd Generation Partnership Project; Technical Specification Group Gore Network and Terminals; Policy and Charging Control over Rx reference point (Release 7); Feb. 2006.

\* cited by examiner

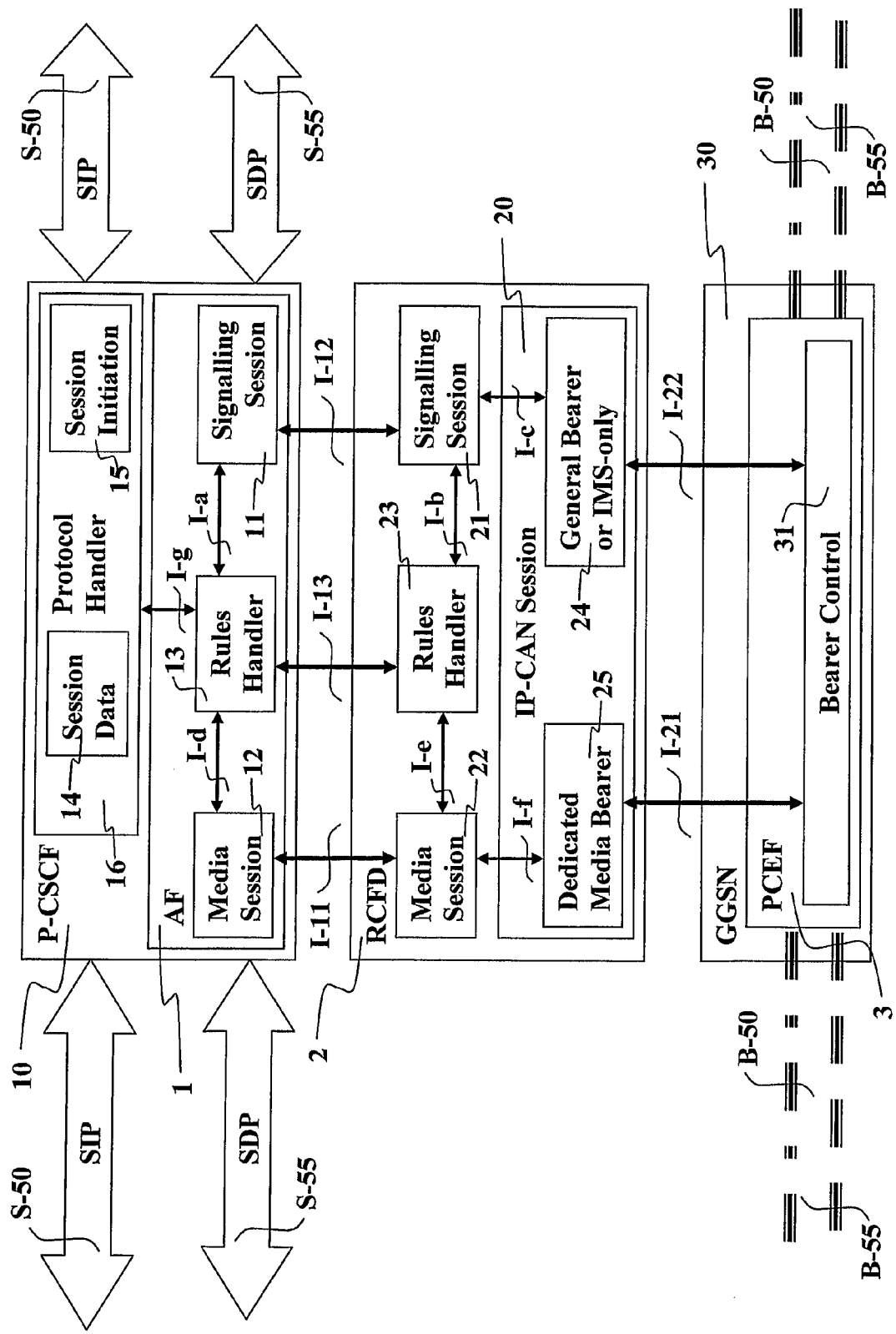
FIG.-1-

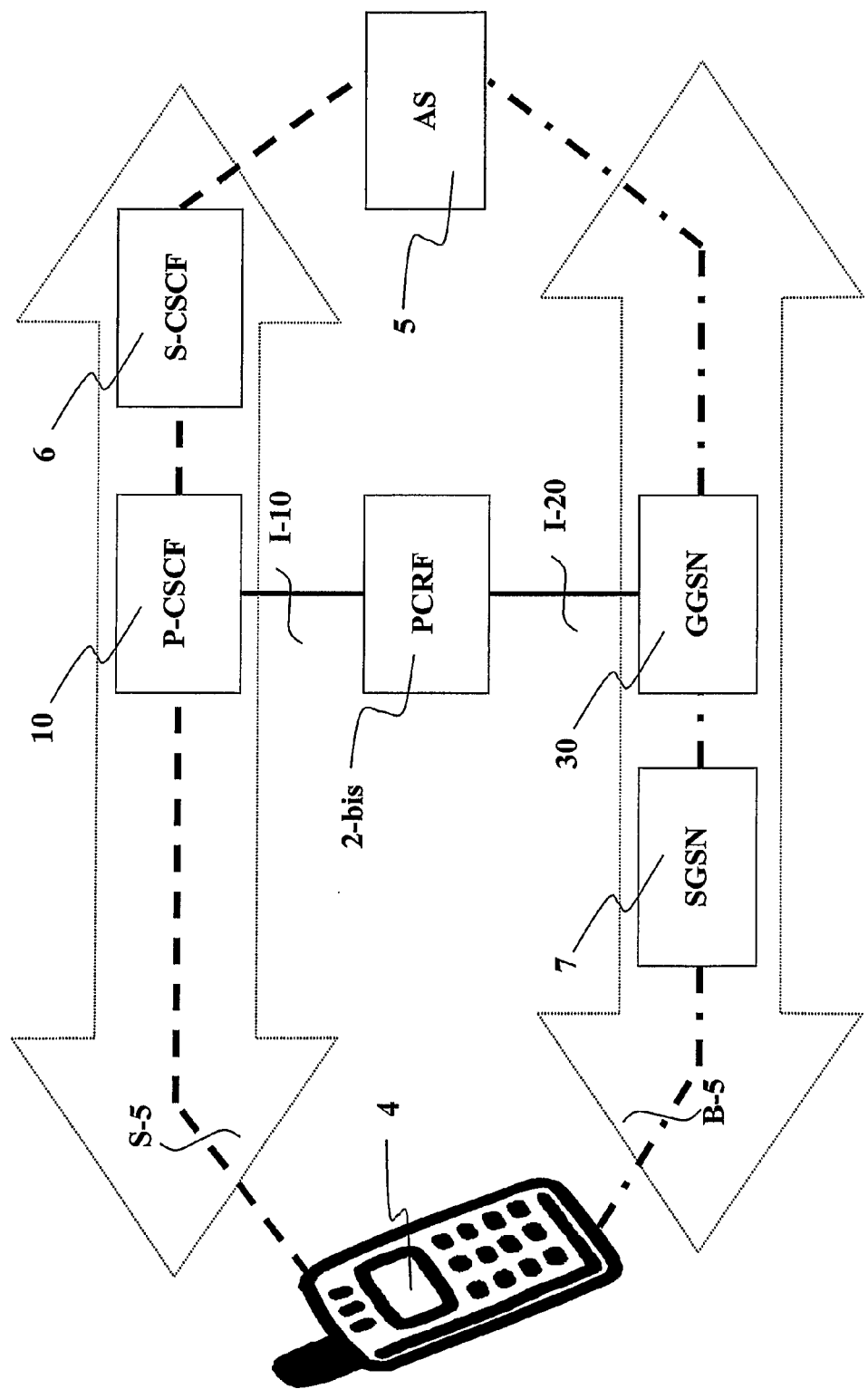
FIG.-2-

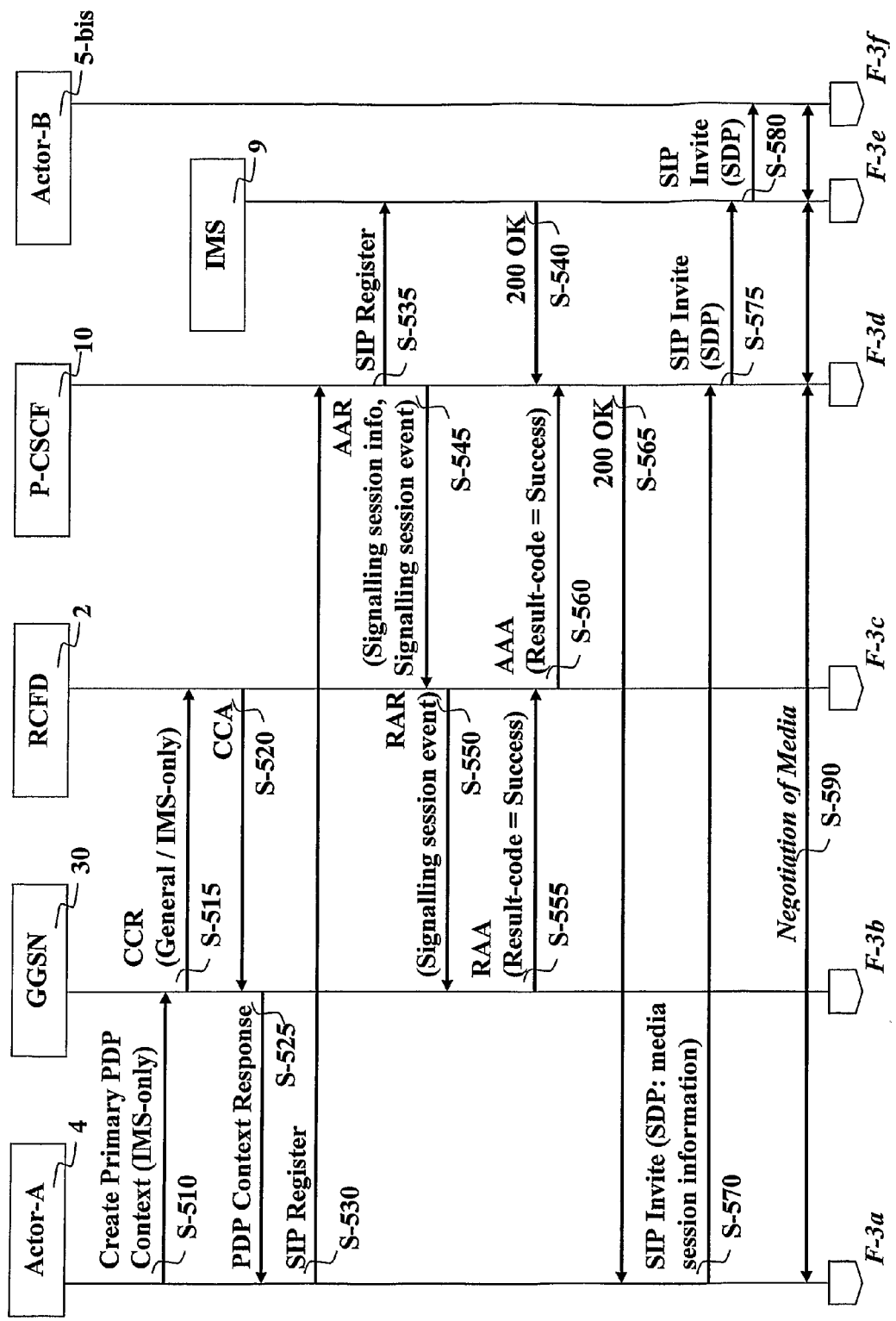
FIG.-3a-

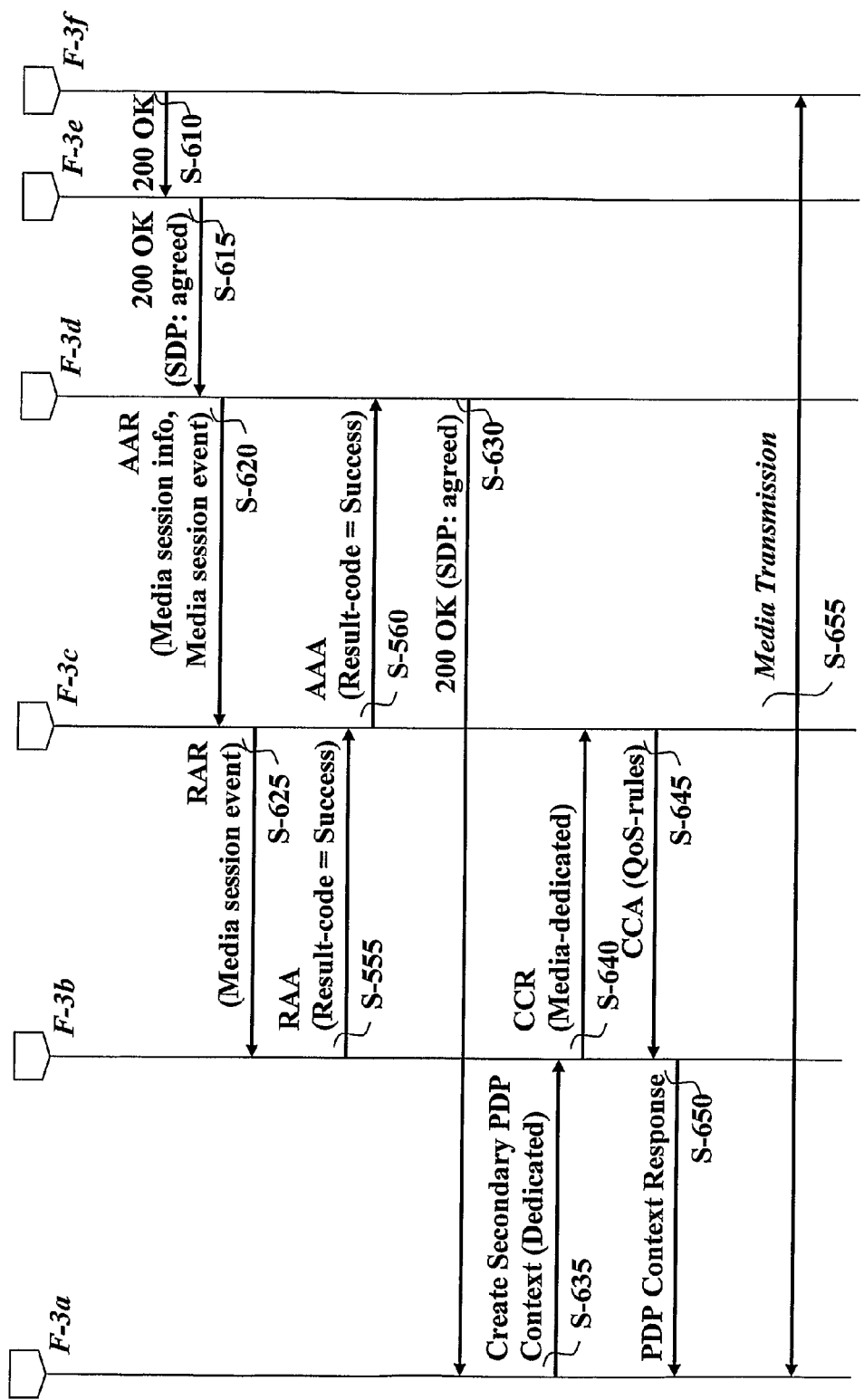
FIG.-3b- ions at page 1 start>
LOSS OF SIGNALLING BEARER TRANSPORT

TECHNICAL FIELD

The present invention generally relates to possible loss of signalling bearer transport through a bearer network without signalling network entities being aware of such event. In particular, the invention relates to procedures for requesting and obtaining notifications of the loss signalling bearer transport.

BACKGROUND

The IP Multimedia Subsystem (hereinafter IMS) enables operators of a Public Land Mobile Network (hereinafter PLMN) to provide their subscribers with multimedia services based and built on Internet applications, services and protocols. Different services and applications as defined by the $3^{rd}$ Generation Partnership Project (hereinafter 3GPP) can be offered on top of IMS, for example a Multimedia Telephony Service as described in 3GPP TS 22.173.

An IMS application, as well as IMS-provided services, includes a exchange of media, such as voice or video, and of signalling for a right interpretation and treatment of the media. In a scenario where a user accesses the IMS through an access network based on an Internet Protocol (hereinafter IP), both signalling and media are transported through a bearer layer as respective signalling and media IP packets, which are generally and respectively referred as signalling IP flow and media IP flows.

A complete support for IMS applications includes a user equipment used by the user who is an IMS subscriber, an IP-Connectivity Access Network (hereinafter IP-CAN) and specific functional elements of the IMS as described in 3GPP TS 23.228. An exemplary IP-CAN may be a General Packet Radio Service (hereinafter GPRS) network.

Before being authorized to make use of IMS services provided by IMS applications, the user has to register into the IMS. However, before being able to register into the IMS, the user has to get IP connectivity to IP-CAN. To this end, and in case the IP-CAN is a GPRS network, the user has to establish a bearer for transporting signalling IP flows, namely the so-called "PDP Context".

Even though IMS signalling and further media flows may be both transported in a same general purpose PDP Context, a general purpose PDP Context is preferably used as a primary dedicated PDP Context for IMS signalling, whereas media flows are preferably transported over a separate secondary dedicated PDP Context.

Therefore, the user accesses a Gateway GPRS Support Node (hereinafter GGSN) to establish a primary PDP Context of a general purpose or, preferably, for IMS signalling only.

Once this primary PDP Context has been established to carry out the IMS signalling IP flow, the user can register into the IMS. The 3GPP IMS makes use of a Session Initiation Protocol (hereinafter SIP) for communication between the user and IMS entities as well as between the IMS entities. The user thus makes use of a SIP Register message for registering into the IMS. Such SIP Register is received at a Proxy Call Session Control Function (hereinafter P-CSCF) server, which is an IMS entity used for accessing the IMS.

In accordance with a well-known 3GPP IMS registration procedure, after having received and processed such message, the P-CSCF forwards it towards an Interrogating Call Session Control Function (hereinafter I-CSCF) server. The latter asks a Home Subscriber Server (hereinafter HSS) for capabilities required for assigning a Serving Call Session Control Function (hereinafter S-CSCF) server for servicing the user. Once the I-CSCF has received such capabilities selects and assigns one S-CSCF fulfilling these capabilities, and the original SIP Register message is forwarded towards the assigned S-CSCF. This S-CSCF requests from the HSS a user profile for the user and, once obtained, the S-CSCF is ready for servicing the user. An IMS registration confirmation is sent back towards the P-CSCF and towards the user indicating the assigned S-CSCF.

Once the user has successfully registered into the IMS, the user can access different IMS applications, and request different IMS services, for which different media resources have to be negotiated between the user equipment of the originating user and either a specific IMS application or a user equipment of a destination user, as the IMS service might require. To this end, the user accesses to IMS with a SIP Invite message, which is received at the P-CSCF and transmitted through the IMS infrastructure towards the S-CSCF and likely further towards an Application Server (hereinafter AS) in charge of a particular IMS application that the user might have invoked. This message has an associated media description required for carrying out the service. This media description is sent with a Session Data Protocol (hereinafter SDP) and is used during the negotiation of the media resources required for carrying out the service.

All the above IMS signalling, SIP signalling during the IMS registration procedure as well as both SIP and SDP signalling during media negotiation procedure, are thus transported as an IMS signalling IP flow in the primary PDP Context established by the user with the GGSN.

During the execution of these IMS registration and media negotiation procedures there is no media to be exchanged yet through the IP-CAN and, consequently, there is no IMS media IP flow through the bearer layer yet.

SUMMARY

Knowledge of a loss of signalling bearer transport through the IP-CAN is an important issue, both when the signalling bearer is used to convey signalling for a session already established as well as when there is no session established yet.

A loss of the IMS signalling IP flow may occur during the bearer transport through an IP-CAN connection for example due to a bad radio condition, or to a recovery action in the GGSN or in a Serving GPRS Support Node. Also for example, if an initial request is sent from the IMS towards a terminating user and there is a failure of the bearer that transports the signalling, there is a number of reattempts depending on a timer before the IMS stops repeating the request unless the originating user clears the session. This leads to an unnecessary tying up of resources with long waiting times for the originating user.

It is an object of the present invention to find a mechanism whereby the loss of signalling bearer transport through the IP-CAN are, at least, minimized. That is, the present invention is aimed to find a mechanism whereby the loss of the IMS signalling IP flow is known to the IMS infrastructure so that proper actions can be taken without wasting time and resources.

A new architecture called Policy and Charging Control (hereinafter PCC) is currently developed under 3GPP TS 23.203 and intended to address different types of access networks. This PCC architecture can selectively control the Quality of Service (hereinafter QoS), Policing and Charging for media flows associated with IMS media sessions for IMS subscribers.

However, this PCC functionality cannot be applied before having established such IMS media sessions.

Consequently, IP flows of a primary PDP Context bearing IMS signalling, which have no associated IMS media session, are excluded from PCC control on QoS requirements, Policing and Charging.

The PCC architecture includes an Application Function (hereinafter AF) offering applications that require control of IP bearer resources and located in the signalling plane for instance in an IMS P-CSCF; a Policing and Charging Enforcement Function (hereinafter PCEF) located in the traffic plane, for instance in a GGSN, and in charge of filtering media IP flows and installing QoS-related rules in order to apply policing and charging per media IP flow; and a Policing and Charging Rules Function (hereinafter PCRF) interposed between the signalling and the bearer layers and responsible for triggering the installation of QoS-related rules towards the PCEF.

The present invention thus relies on amending the PCC model with means to provide the IMS infrastructure with subscriptions and notifications about signalling session events detected on the signalling IP flow transported through the bearer layer.

Therefore, the PCC model needs to be amended so that the AF, or the IMS P-CSCF as such, is enabled to request the establishment of an AF signalling session, specific for signalling in the absence of media session information. This AF signalling session allows the AF to request PCC control procedures, namely subscription to notification of bearer level events for signalling IP flows. Apart from the AF signalling session, the PCC model needs to be amended so that new processing rules are associated at both AF, or the P-CSCF as such, and PCRF in order to manage this AF signalling session specific for signalling. These processing rules are in charge of the establishment of signalling sessions, notification of events, and termination of signalling sessions.

This is achieved by the teaching of the independent claims.

In accordance with a first aspect of the invention, there is provided a Proxy Call Session Control Function server, hereinafter P-CSCF, for accessing an IP Multimedia Subsystem, hereinafter IMS, via signalling transported through a bearer layer bearing media IP flows and a signalling IP flow. This P-CSCF includes: protocol handler for registering a subscriber into the IMS; processing rules handler for establishing a signalling session in absence of a media session, and notifications of signalling session events related to the signalling IP flow; and signalling session means for requesting the notification of the signalling session events detected on the signalling IP flow towards a rules-control function device, hereinafter RCFD.

In this P-CSCF, the signalling session means may include: means for submitting towards the RCFD signalling session information related to the signalling IP flow, in absence of media session information; and means for receiving the notification from the RCFD about the detected signalling session event. In particular, this signalling session information may include an IP address identifying a user equipment (4) used by the subscriber and IP address, and optionally a port number, identifying the P-CSCF.

Advantageously, the protocol handler of the P-CSCF may include session data means for transmitting media session information between the subscriber and the IMS, once the subscriber is registered into the IMS.

In addition to subscription and notification of signalling session events, the P-CSCF may further support subscription and notification of media session events. To this end, the P-CSCF may further include: Quality of Service, hereinafter QoS, rules handler for establishing a media session including QoS-related requirements, and notifications of media session events related to the media IP flows; and media session means for requesting the notification of the media session events detected on the media IP flow towards the RCFD.

This P-CSCF may be implemented in such a way that the processing rules handler and the signalling session means, as well as the advantageous constituent elements thereof as cited above, may be provided in an enhanced application function device based on the PCC model.

In accordance with a second aspect of the invention, there is provided a RCFD for guarantying a QoS negotiated through a signalling layer for media transport through a bearer layer, the bearer layer being a transport layer capable of bearing media IP flows and a signalling IP flow. This RCFD comprises: a bearer session module for subscribing to bearer sessions events to be reported from an IP Connectivity Access Network; processing rules handler for establishing a signalling session in absence of a media session; and signalling session means for receiving a request for notification of signalling session events detected on the signalling IP flow from a requester entity, and for submitting the notification about the detected signalling session event towards the requester entity. In particular, the requester entity may be the P-CSCF or an AF device based on a PCC model and suitable for being included in other network nodes participating in the signalling layer.

The request for notification received at the RCFD may include signalling session information related to the signalling IP flow, in absence of media session information. This signalling session information related to the signalling IP flow may include an IP address identifying the subscriber as well as an IP address, and optionally a port number, identifying the requester entity.

Moreover, this signalling session information related to the signalling IP flow may also include an identifier of relating to a general bearer or to an "IMS-only" bearer so that notifications of signalling session events detected on the signalling IP flow can be received in the bearer session module as relating to a general bearer or to an "IMS-only" bearer.

In accordance with a third aspect of the invention, there is provided a method of reporting towards an entity in a signalling layer a loss of signalling bearer transport occurred at a bearer layer when a user accesses the IMS. The signalling layer offers applications that require a QoS to be guaranteed for media transport through the bearer layer, and the bearer layer is a transport layer capable of bearing media IP flows and a signalling IP flow. This method comprises the steps of: forwarding a registration request received from the user at a P-CSCF to the IMS infrastructure; establishing a signalling session in absence of a media session, and notifications of signalling session events related to the signalling IP flow at the P-CSCF; requesting the notification of the signalling session events detected on the signalling IP flow towards the RCFD; subscribing the RCFD to bearer sessions events to be reported on the signalling IP flow from an IP Connectivity Access Network; and forwarding to the P-CSCF the signalling session events reported to the RCFD as bearer sessions events on the signalling IP flow from the IP Connectivity Access Network.

In this method, the step of requesting notification of the signalling session events may include a step of submitting from the P-CSCF towards the RCFD signalling session information related to the signalling IP flow, in absence of media session information. In particular, the step of submitting signalling session information may include a step of submitting an IP address identifying the user.

Additionally, the method may further include a step of transmitting media session information between the subscriber and the IMS, once the subscriber is registered into the IMS.

In this respect, the method may further include a step of establishing a media session that includes QoS-related requirements, and notifications of media session events related to the media IP flows at the P-CSCF; and a step of requesting the notification of the media session events detected on the media IP flow towards the RCFD.

BRIEF DESCRIPTION OF THE DRAWINGS

The features, objects and advantages of the invention will become apparent by reading this description in conjunction with the accompanying drawings, in which:

FIG. 1 is a block structure illustrating adaptations on a PCC model for being used when accessing IMS through a GPRS access network in order to be notified about a loss of signalling bearer transport.

FIG. 2 is a basic block diagram illustrating an adapted PCC model for use when accessing IMS through a GPRS access network.

FIGS. 3a and 3b show a basic sequence diagram illustrating an exemplary course of actions to be followed for carrying out a method of reporting a loss of signalling bearer transport towards an IMS entity.

DETAILED DESCRIPTION

The following describes some preferred embodiments for adaptation of a PCC model in order to request and get a notification on the loss of signalling bearer transport. Even though the PCC model refers to an AF, a PCRF and a PCEF, the two latter being entities originally intended for policing and charging decisions and enforcement points, the present invention does not necessarily require such functions.

In this respect, amendments to be made on an AF 1 in accordance with the PCC model, as proposed by an aspect of the present invention, may be directly made on the P-CSCF 10 without substantially departing from the general inventive concept behind the present invention. Moreover, amendments to be made on a PCRF 2-bis in accordance with the PCC model, as proposed by another aspect of the present invention, may be made in a rules-control function device 2 (hereinafter RCFD) which is not necessarily used for policing and charging as well.

There is thus provided a method, in accordance with the invention, for reporting towards a P-CSCF 10 located in a signalling layer a loss of signalling bearer transport occurred at a bearer layer when a user accesses the IMS. The signalling layer offers applications that require a quality of service, hereinafter QoS, to be guaranteed for media transport through the bearer layer, whereas the bearer layer is a transport layer capable of bearing media IP flows B-55 and a signalling IP flow B-50. In this respect, the P-CSCF is an IMS where the user accesses the IMS through.

Prior to access the IMS, the user 4 needs to get IP connectivity through an IP Connectivity Access Network, which in an exemplary embodiment throughout the present application is a GPRS network. To this end, as FIG. 3a illustrates, the user 4 requests in step S-510 the establishment of a Primary PDP Context.

Generally speaking, a bearer-usage parameter value is used when issuing the request to indicate how the bearer is going to be used. At present, this value may adopt one among the following values: "general" when no specific bearer usage information is available; "IMS-only" when the bearer is going to be used only for bearing IMS signalling; and "dedicated" when the bearer is going to be used for a dedicated purpose in respect of a particular media transmission. For the purpose of the present invention, the above request for a Primary PDP context preferably indicates "IMS-only" since its usage is intended for bearing IMS signalling.

Such request for establishment of a Primary PDP context is received at a GGSN 30 of a GPRS network exemplary considered the IP-CAN throughout the present specification. The GGSN receiving such a request sends in step S-515 a CCR message towards a rules-control function device 2 (hereinafter RCFD), which is preferably interposed between the signalling layer and the bearer layer, and which may correspond to a PCRF 2-bis in a traditional PCC model enhanced with the novel features provided for the RCFD in order to accomplish the objects of the present invention. Upon receipt of the CCR message, the RCFD 2 gets relevant data about the bearer session established for this Primary PDP Context. To this end, as illustrated in FIG. 1, the RCFD 2 stores this relevant data in a bearer session module 20 as relating to a "general" or "IMS-only" bearer in order to make a distinction versus further possible bearers for media IP flows. This bearer session module may comprise a separate sub-module 24 for dealing with "general" or "IMS-only" bearer for signalling IP flows, and a separate sub-module 25 for dealing with a "dedicated" bearer for media IP flows.

Then, an acknowledge CCA message is sent in step S-520 back from the RCFD 2 towards the GGSN 30, and a corresponding PDP Context Response message sent in step S-525 acknowledges back to the user 4 the establishment of this Primary PDP Context from the GGSN 30.

Once the user has got IP connectivity, the user may access the IMS by registering therein. To this end, the method provides for a step of receiving a SIP Register message in step S-530 at the P-CSCF, and a step of forwarding the SIP Register message in step S-535 towards further IMS infrastructure 9. In this respect, the well-known 3GPP IMS registration procedure, as explained above for background of the present invention, takes place. The IMS infrastructure 9 thus represents all the IMS entities referred therein, such as I-CSCF, HSS and S-CSCF, other than the P-CSCF. In order to carry out these steps of receiving and forwarding the SIP Register message, and as illustrated in FIG. 1, the P-CSCF is equipped with a protocol handler 16, which is in charge of managing the SIP messages S-50 between the user 4 and the other IMS infrastructure 9. In particular, this protocol handler may include dedicated means 15 to deal with pure SIP messages and protocol.

At this stage, different alternative embodiments are possible to accomplish objects of the invention. In one embodiment not drawn in any drawing, the P-CSCF waits for the reception of a SIP "200 OK" message from the IMS infrastructure indicating the successful registration of the user 4 in IMS before triggering the next actions. In another embodiment illustrated in FIG. 3a, the P-CSCF does not wait for the successful registration result and initiates the course of actions required to accomplish objects of the invention. Of course, as receiving the SIP "200 OK" message in a step S-540, such message is forwarded towards the user 4 in a step S-565.

Therefore, irrespective on whether the SIP "200 OK" message was received in step S-540 or not yet, the method comprises a step of establishing a signalling session in absence of a media session during the step I-a at the P-CSCF, as well as those notifications of signalling session events related to the signalling IP flow that the P-CSCF wants to get reported. To this end, as illustrated in FIG. 1, the P-CSCF includes processing rules handler 13 with all the logic required to create and further identify such signalling sessions and such notifications.

Since there is no media session information available within the SIP Register message, and no specific QoS or charging characteristics to be enforced for the signalling IP flows, a request for establishment of a signalling session does not require description of media components or charging-related identifiers.

The step of establishing a signalling session in absence of a media session is also carried out at RCFD 2 during the step I-b. To this end, as also illustrated in FIG. 1, the RCFD 2 also includes a corresponding processing rules handler 23, which is connectable via interface I-13 with the processing rules handler 13 of the P-CSCF, and which contains all the logic required to create and further identify the signalling sessions and notifications at the RCFD 2.

This step of establishing the signalling session in absence of a media session, illustrated in FIG. 3a, is followed by a step S-545 of requesting the notification of the signalling session events to be detected on the signalling IP flow B-50, by means of an AAR message, towards the RCFD 2. To this end, as illustrated in FIG. 1, the P-CSCF 10 is equipped with a signalling session means 11 for requesting such notification of the signalling session events towards the RCFD 2.

Correspondingly and also illustrated in FIG. 1, the RCFD 2 comprises signalling session means 21 for receiving via interface I-12 the request for notification of the signalling session events, and for further submitting via the same interface I-12 the requested notifications.

More specifically, the step S-545 of requesting the notification of the signalling session events may include a step of submitting via interfaces I-12 towards the RCFD 2 signalling session information related to the signalling IP flow, in absence of media session information. Where an enhanced PCRF 2-bis of a PCC model is used, the interface I-10 is used for this submission towards the P-CSCF 10, as illustrated in FIG. 2. This signalling session information is preferably received in the signalling session means 21 of the RCFD 2.

This signalling session information may basically include an indication of "loss of signalling bearer" to be understood by the RCFD 2 as an indication that the P-CSCF 10, or the AF device 1, subscribes to signalling bearer events to be detected on the signalling IP flow, and no specific QoS-related rules and decisions are required for this purpose.

Advantageously, the signalling session information submitted from the P-CSCF 10 towards the RCFD 2 may include an IP address identifying the subscriber 4. Moreover, this signalling session information might include as well an IP address, and optionally a port number, identifying the P-CSCF 10. This signalling session information may be useful for establishing detection criteria to appropriately detect those required signalling session events related to the signalling IP flow.

The method also comprises a step of subscribing the RCFD 2 in step S-550, by means of a RAR message, to bearer sessions events to be reported on the signalling IP flow B-50 from an entity in the IP Connectivity Access Network, which under the present embodiment may be the GGSN 30, or a constituent element 3 included therein, such as an enhanced PCEF 3 in accordance with the PCC model. To this end, the RCFD 2 may associate signalling session information in the signalling session means 21 with the bearer session sub-module 24 dealing with "general" or "IMS-only" bearer for signalling IP flows, via interface I-c. Then, this bearer session sub-module 24 dealing with "IMS-only" bearer for signalling IP flows is thus associated via interface I-22 with a bearer control 31 module in the GGSN 30, or a constituent element 3 included therein, wherein the detection of a signalling session event for the signalling IP flow really takes places.

Once the subscription to such signalling session events is carried out at the GGSN 30, or a constituent element 3 included therein, an acknowledgement is sent back towards the RCFD 2 in step S-555, and a corresponding acknowledge is returned towards the P-CSCF 10 in step S-560.

If, for any reason, the Primary PDP context for IMS signalling is lost, which bearer usage is marked as "general" or "IMS-only", the GGSN 30 or the constituent element 3 notifies this event to the RCFD 2, likely via a diameter CCR message, and the latter in turn notifies such corresponding signalling session event towards the P-CSCF 10, or towards the AF device 1. In this case, at the same time as reporting the event of loss of the signalling bearer, the RCFD 2 terminates the current signalling session via a diameter ASR message.

For this purpose, the method also comprises a step of forwarding towards the P-CSCF 10 and via interface I-12 those signalling session events reported via interface I-22 to the RCFD 2 as bearer sessions events on the signalling IP flow B-50, from the bearer control module 31 in an entity 3 or 30 of the IP Connectivity Access Network.

As receiving a notification of a signalling session event reporting the loss of signalling bearer, the P-CSCF 10 or the AF device 1 may terminate the signalling session and take proper actions through the signalling layer. To this end, the processing rules handler 13, which is also responsible for termination of the signalling session, communicates via internal interface I-g with the protocol handler 16 in order to trigger the appropriate SIP messages towards the user 4 and the other IMS infrastructure 9.

In addition, the method may include a step S-570 of receiving media session information at the P-CSCF 10 from the user 4, once said user is registered into the IMS, and a step S-575 of transmitting the media session information towards the IMS infrastructure 9, and also vice versa. To this end, the P-CSCF includes session data means 14 in the protocol handler 16. This session data means 14 are preferably in charge of dealing with session data protocol (hereinafter SDP) portions used for transferring and negotiating media session information in both directions throughout the signalling layer.

The media session information may be sent in a SIP Invite message during step S-570, which has embedded as SDP the media session information. Such SIP Invite message is forwarded in step S-575 towards the IMS infrastructure 9 and, from there, possibly towards a potential Actor B 5-bis in step S-580, which might be an AS in charge of a particular IMS application, as commented above, or a destination subscriber.

Following these steps of transmitting the media session information, there may be a step S-590 of negotiating the media to be agreed on by the parties, namely between the user equipment 4 of the originating user and the IMS infrastructure 9, or between the user equipment 4 of the originating user and the user equipment 5-bis of the destination user.

As FIG. 3b illustrates, the additional method goes on with the submission back to the P-CSCF in steps S-610 and S-615 of information related with the media agreed on for further communications. Following this, the method includes a step of establishing, via interface I-d in the P-CSCF 10 and via interface I-f in the RCFD 2, a media session that includes QoS-related requirements. During this step, also notifications of media session events related to the media IP flows are established at the P-CSCF 10. To this end, the rules handler 13 of the P-CSCF is also in charge of establishing a media session that includes QoS-related requirements, and notifications of media session events related to the media IP flows B-55.

Aligned with the above steps of the method for notification of signalling session events, also for these steps related to notification of media session events the rules handler 23 of the RCFD 2 is in charge of establishing a media session that includes QoS-related requirements likely in cooperation with the rules handler of the P-CSCF via interface I-13.

The method may further include a step S-620 of requesting the notification of the media session events to be detected on the media IP flow B-55, from the P-CSCF 10 towards the RCFD 2. To this end, the P-CSCF includes media session means 12 for requesting the notification of the media session events to be detected on the media IP flow B-55 towards the RCFD 2, and the latter also includes media session means 22 for providing the notification of the media session events to be detected on the media IP flow B-55 towards the P-CSCF 10.

The method may further comprise a step of subscribing the RCFD 2 in step S-625, by means of a SIP RAR message, to bearer sessions events to be reported on the media IP flow B-55 from the GGSN 30, or a constituent element 3 included therein, such as an enhanced PCEF 3 in accordance with the PCC model.

These latest additional steps of the method in order to get notifications of media session events on the media IP flow B-55 are completed by corresponding acknowledgements as in previous steps S-555 and S-560 respectively.

Then, upon reception of a SIP 200 OK message at the user side 4, indicating a successful negotiation of the media between the originating user equipment 4 and the IMS or the destination user equipment 5-bis, the user equipment may request in step S-635 the establishment of a Secondary PDP Context indicating "dedicated" as bearer usage since its usage is intended for bearing IMS media.

The request for establishment of a Secondary PDP context is received at a GGSN 30, which sends in step S-640 a CCR message towards the RCFD 2. Upon receipt of the CCR message indicating "dedicated" for IMS media, the RCFD 2 gets relevant data about the bearer session established for this Secondary PDP Context. To this end, as illustrated in FIG. 1, the RCFD 2 stores this relevant data in a bearer session module 20 as relating to a "dedicated" in order to make a distinction versus the previous bearer for a signalling IP flow. This bearer session module may comprise a separate sub-module 25 for dealing with this "dedicated" bearer for media IP flows.

The RCFD 2 receiving the CCR message for the Second PDP Context indicating it is a "dedicated" bearer for IMS media, installs QoS-related rules towards the GGSN 30 in step S-645, and the GGSN eventually acknowledges to the user 4 in step S-650 the establishment of the Secondary PDP Context.

From step S-655 on, media transmission can be exchanged in accordance with negotiated QoS requirements.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A Proxy Call Session Control Function (P-CSCF) server for accessing an IP Multimedia Subsystem (IMS) via IMS signaling transported through a bearer layer, the bearer layer bearing one or more IP flows of media (media IP flows) and an IP flow of signaling (a signaling IP flow), wherein the Proxy Call Session Control Function server operates in a Policy and Charging Control (PCC) architecture and is configured to perform the following:
   establish, during registration of a subscriber with the IMS and prior to receiving media session information agreed to for the media, a signaling session for the subscriber, the signaling session being related to the signaling IP flow;
   send to a rules-control function device prior to receiving the media session information, a request for notifications of signaling session events related to the signaling IP flow, wherein the signaling IP flow is transported through the bearer layer, and the request includes signaling session information related to the signaling IP flow without the media session information related to the media IP flows;
   receive from the rules-control function device, a notification of a signaling session event detected on the signaling IP flow by an entity at the bearer layer; and
   inform the IMS of the detected signaling session event.

2. The Proxy Call Session Control Function server of claim 1, wherein the signaling session information related to the signaling IP flow includes an IP address identifying a user equipment used by the subscriber.

3. The Proxy Call Session Control Function server of claim 2, wherein the signaling session information related to the signaling IP flow further includes an IP address, and optionally a port number, identifying the Proxy Call Session Control Function server.

4. The Proxy Call Session Control Function server of claim 1, further configured to transmit the media session information between the subscriber and the IMS when registration is complete.

5. The Proxy Call Session Control Function server of claim 4, further configured to perform the following:
   establish a media session that includes Quality of Service (QoS) related requirements; and
   request from the rules-control function device, notifications of media session events that affect the QoS of the media IP flows transported through the bearer layer during the media session.

6. An application function device for offering through a signaling layer, applications that require a quality of service (QoS) to be guaranteed for media transported through a bearer layer, the bearer layer being a transport layer for bearing one or more IP flows of media (media IP flows) and an IP flow of signaling (a signaling IP flow), wherein the application function device operates in a Policy and Charging Control (PCC) architecture and is configured to perform the following:

establish, during registration of a subscriber with a core network and prior to receiving media session information agreed to for the media, a signaling session for the subscriber, on the signaling session being related to the signaling IP flow;

send to a rules-control function device prior to receiving the media session information, a request for notifications of signaling session events related to the signaling IP flow, wherein the signaling IP flow is transported through the bearer layer, and the request includes signaling session information related to the signaling IP flow without the media session information related to the media IP flows;

receive from the rules-control function device, a notification of a signaling session event detected on the signaling IP flow by an entity at the bearer layer; and inform the core network of the detected signaling session event.

7. The application function device of claim 6, wherein the signaling session information related to the signaling IP flow includes an IP address identifying a user equipment used by the subscriber.

8. The application function device of claim 6, further configured to terminate the signaling session in response to a signaling session event.

9. The application function device of claim 6, further configured to request from the rules-control function device, notifications of media session events related to the media IP flows transported through the bearer layer.

10. The application function device of claim 9, further configured to perform the following:

submit to the rules-control function device, the media session information related to the media IP flows transported through the bearer layer, including Quality of Service (QoS) related requirements; and receive a notification from the rules-control function device of a media session event related to the media IP flows transported through the bearer layer.

11. A rules-control function device for triggering installation of rules related to a quality of service (QoS) negotiated with signaling through a signaling layer for media transported through a bearer layer, the bearer layer being a transport layer for bearing one or more IP flows of media (media IP flows) and an IP flow of signaling (a signaling IP flow), wherein the rules-control function device operates in a Policy and Charging Control (PCC) architecture and is configured to perform the following:

subscribe to events of bearer sessions, including signaling session events and media session events in the bearer layer, the events to be reported from an IP Connectivity Access Network (IP-CAN);

establish with a requester entity, a signaling session for a subscriber prior to receiving media session information agreed to for the media, the signaling session being related to the signaling IP flow;

receive from the requester entity prior to receiving the media session information, a request for notifications of signaling session events related to the signaling IP flow, wherein the signaling IP flow is transported through the bearer layer, and the request includes signaling session information related to the signaling IP flow without the media session information related to the media IP flows;

receive from the IP-CAN, a notification of a signaling session event detected on the signaling IP flow by an entity at the bearer layer; and forward to the requester entity, the notification of the detected signaling session event received from the IP-CAN.

12. The rules-control function device of claim 11, wherein the signaling session information related to the signaling IP flow includes an IP address identifying a user equipment used by the subscriber.

13. The rules-control function device of claim 12, wherein the signaling session information related to the signaling IP flow includes an IP address, and optionally a port number, identifying the requester entity.

14. The rules-control function device of claim 11, wherein the signaling session information related to the signaling IP flow includes an identifier of a general purpose bearer or a bearer utilized only for IMS signaling.

15. The rules-control function device of claim 11, wherein the notifications of signaling session events related to the signaling IP flow and received from the IP-CAN relate to a general purpose bearer or to a bearer utilized only for IMS signaling.

16. A method of reporting to an entity in a signaling layer, a loss of signaling bearer transport occurring at a bearer layer when a user accesses an IP Multimedia Subsystem (IMS), the signaling layer offering applications that require a quality of service (QoS) to be guaranteed for media transported through the bearer layer, the bearer layer being a transport layer for bearing one or more IP flows of media (media IP flows) and an IP flow of signaling (a signaling IP flow), the method comprising the steps of:

forwarding towards the IMS by a Proxy Call Session Control Function (P-CSCF) server, a registration request received from the user;

establishing by the P-CSCF server, a signaling session for the user prior to receiving media session information agreed to for the media, the signaling session being related to the signaling IP flow;

sending to a rules-control function device prior to receiving the media session information, a request for notifications of signaling session events related to the signaling IP flow, wherein the signaling IP flow is transported through the bearer layer, and the request includes signaling session information related to the signaling IP flow without the media session information related to the media IP flows;

subscribing by the rules-control function device, to events of bearer sessions, including signaling session events and media session events in the bearer layer, the events to be reported on the signaling IP flow from an IP Connectivity Access Network (IP-CAN);

receiving from the IP-CAN, a notification of a signaling session event detected on the signaling IP flow by an entity at the bearer layer;

forwarding by the rules-control function device to the P-CSCF server, the notification of the detected signaling session event received from the IP-CAN; and informing the IMS of the detected signaling session event.

17. The method of claim 16, wherein the signaling session information related to the signaling IP flow includes an IP address identifying a user equipment used by the user.

18. The method of claim 16, further comprising transmitting the media session information between the user and the IMS when registration is complete.

19. The method of claim 18, further comprising the following steps performed by the P-CSCF server:
- establishing a media session that includes Quality of Service (QoS) related requirements; and
- requesting from the rules-control function device, notifications of media session events that affect the QoS of the media IP flows transported through the bearer layer during the media session.

20. The application function device of claim 6, wherein the device is implemented in a Proxy Call Session Control Function (P-CSCF) server.

\* \* \* \* \*

UNITED STATES PATENT AND TRADEMARK OFFICE
CERTIFICATE OF CORRECTION

| | | |
|---|---|---|
| PATENT NO. | : 9,635,062 B2 | Page 1 of 1 |
| APPLICATION NO. | : 12/305513 | |
| DATED | : April 25, 2017 | |
| INVENTOR(S) | : Castellanos Zamora et al. | |

It is certified that error appears in the above-identified patent and that said Letters Patent is hereby corrected as shown below:

On the Title Page

Item (56), under "U.S. PATENT DOCUMENTS", in Column 2, Line 6, delete "Chowdhury" and insert -- Chowdhury et al. --, therefor.

Item (56), under "OTHER PUBLICATIONS", in Column 2, Line 3, delete "archtecture" and insert -- architecture --, therefor.

In the Specification

In Column 1, Line 24, delete "a exchange" and insert -- an exchange --, therefor.

In the Claims

In Column 11, Line 10, in Claim 6, delete "on the" and insert -- the --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*